(12) United States Patent
Watanabe

(10) Patent No.: US 8,477,422 B2
(45) Date of Patent: Jul. 2, 2013

(54) OPTICAL ELEMENT AND OPTICAL ISOLATOR USING THE SAME

(75) Inventor: Toshiaki Watanabe, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 49 days.

(21) Appl. No.: 12/385,542

(22) Filed: Apr. 10, 2009

(65) Prior Publication Data

US 2009/0268289 A1    Oct. 29, 2009

(30) Foreign Application Priority Data

Apr. 23, 2008  (JP) ................... 2008-112403

(51) Int. Cl.
*G02B 5/30*  (2006.01)
*G02F 1/09*  (2006.01)

(52) U.S. Cl.
CPC .................. *G02F 1/093* (2013.01)
USPC ............................................. 359/484.03

(58) Field of Classification Search
None
See application file for complete search history.

(56) References Cited

U.S. PATENT DOCUMENTS 5,864,427 A * 1/1999 Fukano et al. ........... 359/487.06
5,886,820 A * 3/1999 Tajima et al. ................. 359/492
7,003,182 B2 2/2006 Hata et al.
7,039,280 B2 * 5/2006 Hata et al. ....................... 385/50

FOREIGN PATENT DOCUMENTS

JP  A-2003-207744  7/2003
JP  A-2004-037812  2/2004

OTHER PUBLICATIONS

Abe, "Applied Optoelectronics Handbook," 1989, pp. 77-78, published by Shokodo Co., Ltd.
Office Action issued Nov. 15, 2011 in Japanese Patent Application No. 2008-112403, with partial English translation.
Decision of Refusal dated Mar. 6, 2012 issued in Japanese Patent Application No. 2008-112403 (with translation).

* cited by examiner

*Primary Examiner* — Derek S Chapel
(74) *Attorney, Agent, or Firm* — Oliff & Berridge, PLC

(57) ABSTRACT

An optical element includes at least with a Faraday rotator of which both light-transmission surfaces are bonded through a bonding layer to light-transmission surfaces of polarization glasses which are orientationally dispersed with anisotropically-shaped particles at their surfaces. Each of the polarization glasses includes the orientationally dispersed anisotropically-shaped particles only at one surface opposite to the bonding surface. A relation $t \geq 30$ μm is satisfied, wherein t denotes a distance between one of the bonding surfaces of the Faraday rotator and that surface of the polarization glass on the one of the bonding surfaces of the Faraday rotator which is disposed with the particles. As a result, high isolation (25 dB or higher) can be maintained, even if a polarization glass which includes a thin layer with orientationally dispersed anisotropically-shaped particles is used.

2 Claims, 4 Drawing Sheets

OPTICAL ELEMENT AND OPTICAL ISOLATOR USING THE SAME

BACKGROUND OF THE INVENTION

1. Field of the Invention

The present invention relates to an optical element incorporated in an optical device used in combination with a semiconductor laser, for example, and to an optical isolator using the optical element.

2. Related Art

An optical isolator produced using an optical element where a Faraday rotator and polarization glasses produced by orientationally dispersing with metal anisotropically-shaped particles in a glass substrate are bonded together is used for example in a semiconductor laser module as an optical device. (See "Applied Optoelectronics Handbook", PP. 77-78 edited by editorial committee for Applied Optoelectronics Handbook, Shokodo).

An optical isolator is typically required to have isolation characteristic (extinction ratio) of 25 dB or higher.

Therefore, a polarization glass used for this purpose is also required to have isolation characteristic of 25 dB or higher. As anisotropically-shaped particles (typically silver or copper particles) are arranged in the vicinity of a surface of the glass substrate in this polarization glass, backscattering of incident light (i.e. a phenomenon that reflection light returns to the direction of incident light) occurs depending on used particles.

If the thickness of a layer oriented with anisotropically-shaped particles is simply reduced, a problem is caused, i.e., isolation characteristic of the polarization glass is lowered to less than 25 dB. If particles are oriented intensively in a thin layer (less than 10 µm) in order to increase the isolation, backscattering is increased.

Therefore, when such a polarization glass is bonded to a Faraday rotator, light scattering occurs on a surface of the Faraday rotator and in the layer of the polarization glass where anisotropic particles are orientationally dispersed, so that isolation characteristic is affected and deteriorated.

SUMMARY OF THE INVENTION

The present invention has been made in view of the above-mentioned problems. An object of the present invention is to provide an optical element to maintain high isolation characteristic (25 dB or higher) even if a polarization glass including a thin layer with orientationally dispersed anisotropically-shaped particles is used, and to provide an optical isolator using the optical element.

In order to solve above problems, present invention provides an optical element at least with a Faraday rotator of which both light-transmission surfaces are bonded through a bonding layer to light-transmission surfaces of polarization glasses which are orientationally dispersed with anisotropically-shaped particles at their surfaces, wherein each of the polarization glasses includes the orientationally dispersed anisotropically-shaped particles only at one surface opposite to the bonding surface, and a relation $t \geq 30$ µm is satisfied, wherein "t" denotes a distance between one of the bonding surfaces of the Faraday rotator and that surface of the polarization glass on said one of the bonding surfaces of the Faraday rotator which is disposed with said particles.

In an optical element of the present invention, a surface of each of the polarization glasses opposite to the only one surface at which anisotropically-shaped particles are orientationally dispersed is bonded to each of both light-transmission surfaces of the Faraday rotator, and the optical element satisfies a relation $t \geq 30$ µm, where "t" denotes a distance between one of the bonding surfaces of the Faraday rotator and that surface of the polarization glass on said one of the bonding surfaces of the Faraday rotator which is disposed with said particles.

An optical element thus satisfying the relation $t \geq 30$ µm, where "t" denotes a distance between one of the bonding surfaces of the Faraday rotator and that surface of the polarization glass on said one of the bonding surfaces of the Faraday rotator which is disposed with said particles, enables to maintain high isolation characteristic, in particular isolation characteristic of 25 dB or higher, even if a layer with orientationally dispersed anisotropically-shaped particles has a small thickness, so that an optical element with small backscattering can be obtained.

There is also provided in the present invention an optical isolator that is produced using the above-mentioned optical element.

As the optical element of the present invention can be made to have high isolation characteristic, as mentioned above, an optical isolator using such optical element can be made to have high isolation characteristic, too.

As mentioned above, the optical element of the present invention and the optical isolator using it can be made to maintain high isolation characteristic which is hardly lowered due to backscattering or the like, even if a layer with orientationally dispersed anisotropically-shaped particles in the polarization glass has a small thickness.

DETAILED DESCRIPTION OF THE PREFERRED EMBODIMENTS

The present invention will be described more specifically below.

As mentioned above, an optical element to maintaining high isolation characteristic (25 dB or higher) even if a polarization glass including a thin layer with orientationally dispersed anisotropically-shaped particles is used, and an optical isolator using such the optical element have been desired to be developed.

The inventor of the present invention has made investigation into a structure of an optical element being able to maintain high isolation characteristic (25 dB or higher) even if a polarization glass including a thin layer with orientationally dispersed anisotropically-shaped particles is used.

As a result, the inventor found that by using an optical element in which anisotropically-shaped particles are orientationally dispersed only at one surface of the polarization glass, in which a Faraday rotator is bonded to a light-transmission surface opposite to the surface of the dispersed layer, and in which a relation $t \geq 30$ µm is satisfied, where "t" denotes a distance between a surface of the polarization glass at which anisotropically-shaped particles are orientationally dispersed and the bonding surface of the Faraday rotator, isolation characteristic could be maintained at a high level, and the inventor has thus completed the invention.

Figure 1:
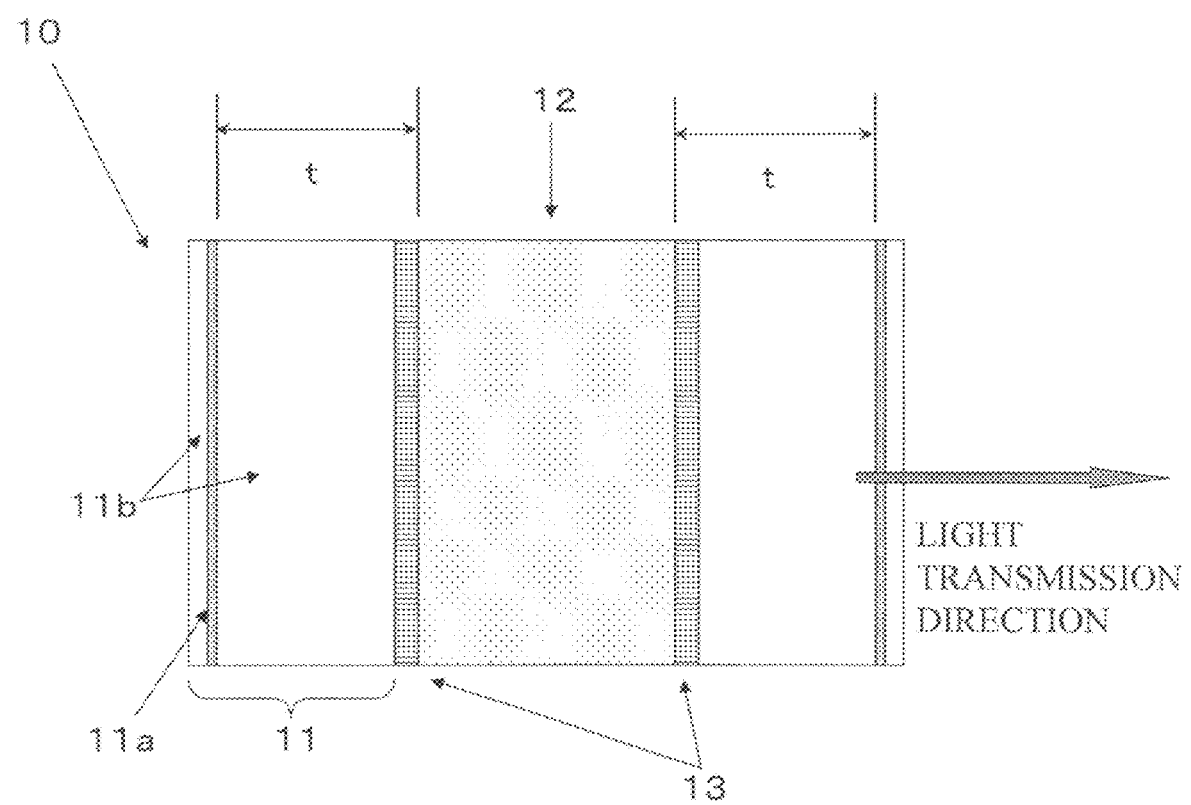
FIG. 1 is a cross-sectional schematic view of an exemplary structure of the optical element of the present invention.

An embodiment according to the present invention will now be explained hereinafter, the present invention is not restricted thereto. FIG. 1 is a cross-sectional schematic view of an exemplary structure of the optical element of the present invention.

As shown in FIG. 1, an optical element 10 of the present invention is at least provided with a Faraday rotator 12, polarization glasses 11 which are arranged on the both sides of the light-transmission surfaces of the Faraday rotator 12 and which includes a layer with orientationally dispersed anisotropically-shaped particles 11a in a glass substrate 11b in the vicinity of one of the glass surfaces, and a bonding layer 13 for bonding the polarization glasses 11 and the Faraday rotator 12.

Here, with respect to each polarization glass 11, a light-transmission surface, which is farther from the layer with orientationally dispersed anisotropically-shaped particles 11a is, bonded through the bonding layer 13 to each of the light-transmission surfaces of the Faraday rotator 12.

In addition, a relation $t \geq 30$ μm is satisfied, where "t" is as defined in the Summary of the Invention.

It is preferable to use the polarization glass 11 having isolation characteristic of 25 dB or higher. Such the polarization glass can maintain the isolation characteristic of the optical element to a high level.

Typically, due to backscattering caused by anisotropic particles in a layer with orientationally dispersed anisotropically-shaped particles, scattering light due to multiple reflection is caused 1) between the Faraday rotator surface and the anisotropic particles, 2) between the other polarization glass and the Faraday rotator, and 3) among anisotropic particles of the two polarization glasses, so that isolation characteristic is deteriorated. But by making the distance "t" including the thickness of the bonding layer longer, this phenomenon tends to be mitigated, and a preferable isolation characteristic value can be obtained with "t" of 30 μm or longer. Accordingly, the isolation characteristic can be made high, and more specifically, even if a layer with orientationally dispersed anisotropically-shaped particles has a small thickness, high isolation characteristic (25 dB or higher) can be obtained and at the same time backscattering of laser light can be suppressed.

Using the optical element 10, an optical isolator can be made. As mentioned above, as the optical element of the present invention has high isolation characteristic, an optical isolator using such optical element can be made to have high isolation characteristic.

A method for producing the optical element 10 will be explained briefly below.

First, at least two polarization glasses and one Faraday rotator are prepared.

Here, the polarization glass is formed with a layer with orientationally dispersed anisotropically-shaped particles only on one surface.

Then on both light-transmission surfaces of the Faraday rotator, or on a light-transmission surface of each of the polarization glasses opposite to the surface of the layer with orientationally dispersed anisotropically-shaped particles, a bonding layer is formed. This bonding layer may be an epoxy resin, for example.

Next, the light-transmission surface of the Faraday rotator and the light-transmission surface of each of the polarization glass are bonded through the formed bonding layer so as to produce an optical element. Here, a light-transmission surface of the polarization glass, which is farther from the layer with orientationally dispersed anisotropically-shaped particles, becomes the bonding surface to the Faraday rotator.

Thus produced optical element can suppress backscattering and the like and can maintain high isolation characteristic, even if a layer with orientationally dispersed anisotropically-shaped particles has a small thickness.

EXAMPLE

The present invention will be described more specifically based on examples and comparative examples, but the present invention is not limited thereto.

Examples 1 to 4

Comparative Examples 1 to 4

Fifty polarization glasses and 25 Faraday rotators were prepared.

Figure 2:
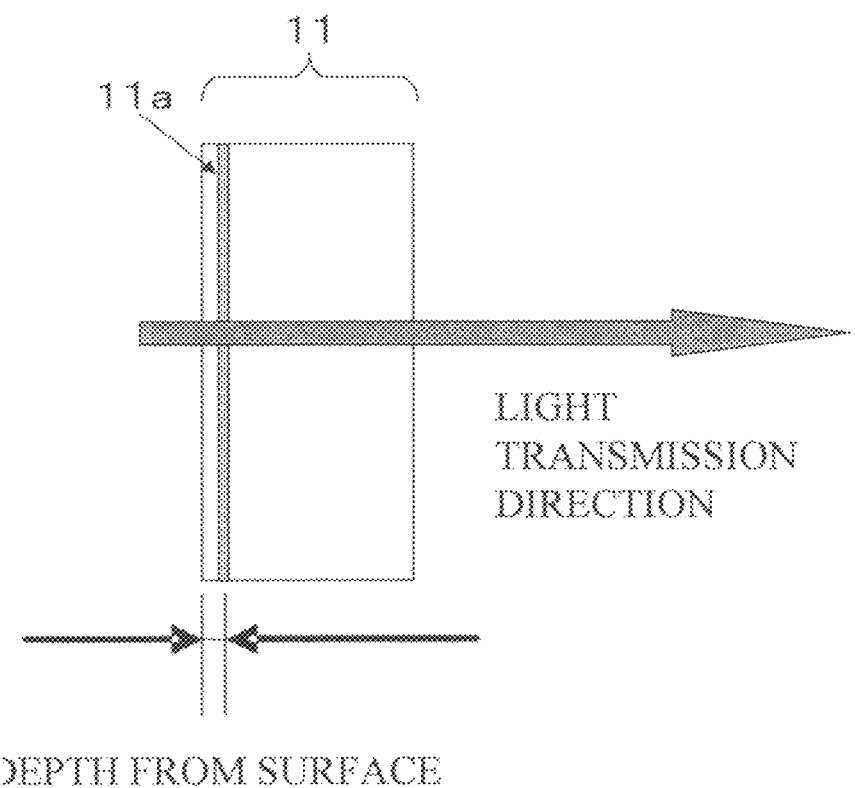
FIG. 2 is an enlarged view illustrating the polarization glass used in Examples and Comparative Examples.

Each of the polarization glasses had a size of 15 mm×15 mm, and had, at the depth of 4 μm, a layer with orientationally dispersed anisotropically-shaped particles being formed at one surface of a glass substrate, as shown in FIG. 2. Twelve among 50 polarization glasses had an extinction ratio of 25 dB (Example 1 and Comparative Example 1), twelve had an extinction ratio of 32 dB (Example 2 and Comparative Example 2), twelve had an extinction ratio of 38 dB (Example 3 and Comparative Example 3), and fourteen had an extinction ratio of 45 dB (Example 4 and Comparative Example 4), respectively.

The Faraday rotator having the plane of polarization of transmitted light with a wavelength of 1550 nm at 45 degree. Both of its light-transmission surfaces, which would become bonding surfaces, were coated in advance with Anti-Reflection treatment coating (AR coating) against an adhesive.

Then a thickness of each of the polarization glasses was adjusted by polishing the surface opposite to the surface of the layer with orientationally dispersed anisotropically-shaped particles so that the distance "t" between each layer with orientationally dispersed anisotropically-shaped particles and the bonding surface with the Faraday rotator exhibited the following values. In the case of extinction ratio of the polarization glass being 25 dB, the distance "t" was set to be 15 and 20 (in Comparative Example 1), while it was set to be 30, 50, 80 and 100 (in Example 1). In the case of extinction ratio of the polarization glass being 32 dB, the distance "t" was set to be 15 and 20 (in Comparative Example 2), while it was set to be 30, 50, 80 and 100 (in Example 2). In the case of extinction ratio of the polarization glass being 38 dB, the distance "t" was set to be 15 and 20 (in Comparative Example 3), while it was set to be 30, 50, 80 and 100 (in Example 3). In the case of extinction ratio of the polarization glass being 45 dB, the distance "t" was set to be 15 and 20 (in Comparative Example 4), while it was set to be 30, 35, 50, 80 and 100 (in Example 4).

Then, each of the polarization glass having been polished was coated with an AR coating against air on the light-transmission surface having the layer with orientationally dispersed anisotropically-shaped particles, while it was coated with an AR coating against an adhesive on the light-transmission surface which would be bonded to the Faraday rotator through the bonding layer.

Then, using an epoxy adhesive, the light-transmission surface of the Faraday rotator and the light-transmission surface of the polarization glass opposite to the side having a layer with orientationally dispersed anisotropically-shaped particles were bonded together, so that an optical element was manufactured.

Then the optical element fixed by bonding was observed by a scanning electron microscope (SEM) from the lateral side in order to measure the distance between the bonding surface of the Faraday rotator and the layer with orientationally dispersed anisotropically-shaped particles, so that it was confirmed that the desired distance "t" was obtained in each optical element. During the observation and measurement, the thickness of the epoxy adhesive was added to the distance "t", as the adhesive became an equivalent component as the glass substrate after being cured and thus can be regarded as a part of the glass layer.

Figure 3:
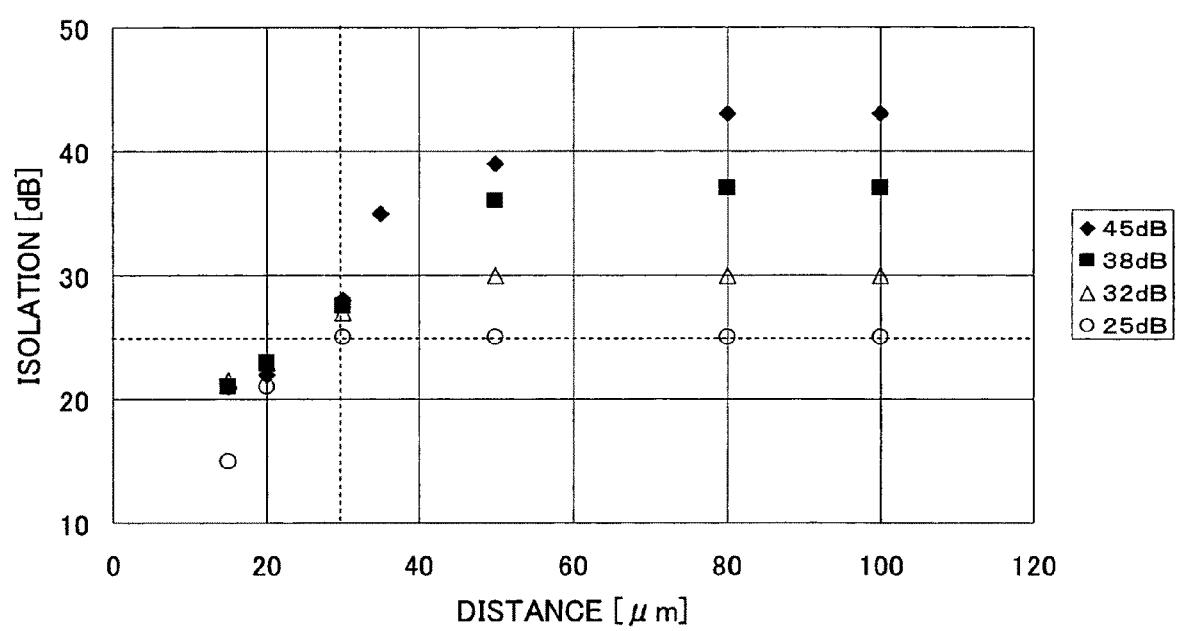
FIG. 3 is a graph showing isolation characteristic values in Examples and Comparative Examples with respect to distances between the surface of the Faraday rotator and the layer with orientationally dispersed anisotropic particles.

In order to evaluate the isolation characteristic of the produced optical element, necessary and sufficient magnetic field was given to the Faraday rotator in the optical element, and then laser light with a wavelength of 1550 nm entered into the light-transmission surface of the optical element. The result of the evaluation is shown in FIG. 3. FIG. 3 is a graph showing extinction ratio values with respect to various distances between the surface of the Faraday rotator and the layer of orientationally dispersed anisotropic particles.

As shown in FIG. 3, an isolation characteristic value of 25 dB or higher which is required for an optical isolator could be obtained independently of the extinction ratio of the used polarization glass if the distance "t" of 30 µm or longer is assured. On the contrary, it is apparent, even if a polarization glass with high extinction ratio is used, the high isolation characteristic cannot be maintained in the case of "t" being less than 30.

Comparative Example 5

Figure 4:
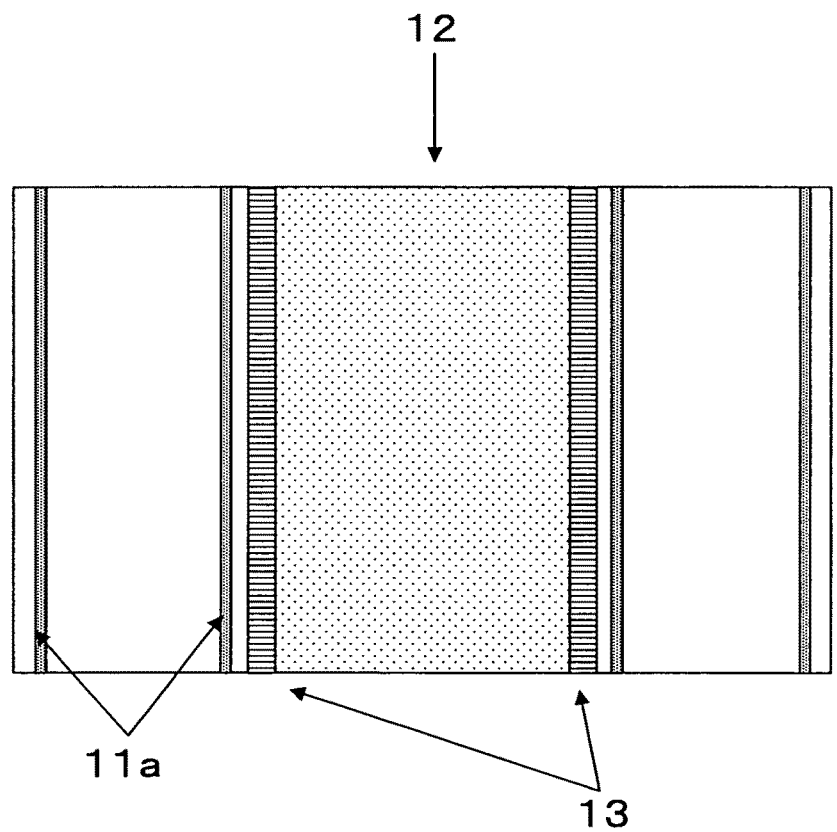
FIG. 4 is a schematic view of the optical element of Comparative Example 5.

As shown in FIG. 4, an optical element was produced by using polarization glasses including layers with orientationally dispersed anisotropically-shaped particles in the vicinity of the both surfaces of each of the polarization glasses (extinction ratio: 45 dB) and a Faraday rotator and by bonding them together as in the above examples (Comparative Example 5). When its isolation characteristic was evaluated, isolation was 21 dB at maximum. It became apparent that performance requirement as an optical isolator could not be satisfied.

The present invention is not limited to the embodiment described above. The above-described aspects are mere examples and those having substantially the same structure as technical ideas described in the appended claims and providing the similar functions and advantages are included in the scope of the present invention.

What is claimed is:

1. An optical element at least with a Faraday rotator of which both light-transmission surfaces are bonded through a bonding layer to light-transmission surfaces of polarization glasses which are orientationally dispersed with anisotropically-shaped particles at their surfaces, wherein
    each of the polarization glasses includes a layer which is orientationally dispersed with the anisotropically-shaped particles only at one surface opposite to the bonding surface, the layer having a thickness of less than 10 µm,
    and a relation $t \geq 30$ µm is satisfied, wherein t denotes a distance between one of the bonding surfaces of the Faraday rotator and the layer of the polarization glass on said one of the bonding surfaces of the Faraday rotator which is dispersed with said particles.

2. An optical isolator that is produced using the optical element according to claim 1.

* * * * *